United States Patent
Brooks

(10) Patent No.: US 7,627,423 B2
(45) Date of Patent: Dec. 1, 2009

(54) ROUTE BASED ON DISTANCE

(75) Inventor: Amanda S. Brooks, Minneapolis, MN (US)

(73) Assignee: Wright Ventures, LLC, Minneapolis, MN (US)

( * ) Notice: Subject to any disclaimer, the term of this patent is extended or adjusted under 35 U.S.C. 154(b) by 806 days.

(21) Appl. No.: 11/077,251

(22) Filed: Mar. 10, 2005

(65) Prior Publication Data

US 2006/0206258 A1 Sep. 14, 2006

(51) Int. Cl.
*G01C 21/34* (2006.01)
(52) U.S. Cl. .................. 701/202; 701/209; 340/995.19
(58) Field of Classification Search .................. 701/202, 701/209, 117, 206, 211, 23; 340/995.19; 709/223, 236
See application file for complete search history.

(56) References Cited

U.S. PATENT DOCUMENTS

| | | | |
|---|---|---|---|
| 4,848,780 A | 7/1989 | Straub | |
| 5,938,720 A * | 8/1999 | Tamai | 701/209 |
| 6,013,007 A * | 1/2000 | Root et al. | 482/8 |
| 6,032,108 A * | 2/2000 | Seiple et al. | 702/97 |
| 6,513,532 B2 * | 2/2003 | Mault et al. | 600/595 |
| 6,545,637 B1 * | 4/2003 | Krull et al. | 342/357.09 |
| 6,657,558 B2 | 12/2003 | Horita et al. | |
| 6,687,615 B1 | 2/2004 | Krull et al. | |
| 6,736,759 B1 | 5/2004 | Stubbs et al. | |
| 6,759,970 B1 | 7/2004 | Horita et al. | |
| 6,795,769 B2 | 9/2004 | Kaji et al. | |
| 6,816,781 B2 | 11/2004 | Imanishi | |
| 6,941,222 B2 | 9/2005 | Yano et al. | |
| 6,947,834 B2 | 9/2005 | Duckek | |
| 6,950,746 B2 | 9/2005 | Yano et al. | |
| 7,162,363 B2 * | 1/2007 | Chinitz | 701/202 |
| 2001/0025221 A1 * | 9/2001 | Klein | 701/209 |
| 2001/0025222 A1 * | 9/2001 | Bechtolsheim et al. | 701/209 |
| 2004/0088392 A1 * | 5/2004 | Barrett et al. | 709/223 |
| 2005/0131581 A1 * | 6/2005 | Sabe et al. | 700/245 |
| 2006/0085106 A1 * | 4/2006 | Gaudiano et al. | 701/23 |
| 2006/0167622 A1 * | 7/2006 | Bodin et al. | 701/206 |
| 2006/0183603 A1 * | 8/2006 | Astilean | 482/8 |
| 2006/0206258 A1 * | 9/2006 | Brooks | 701/202 |
| 2006/0217127 A1 * | 9/2006 | Drane et al. | 455/456.1 |
| 2007/0073897 A1 * | 3/2007 | Sharifzadeh et al. | 709/238 |
| 2007/0106468 A1 * | 5/2007 | Eichenbaum et al. | 701/211 |
| 2007/0271034 A1 * | 11/2007 | Perry | 701/209 |
| 2007/0288156 A1 * | 12/2007 | Neff et al. | 701/202 |
| 2008/0021632 A1 * | 1/2008 | Amano | 701/117 |
| 2008/0027639 A1 * | 1/2008 | Tryon | 701/209 |

OTHER PUBLICATIONS

Garmin, "Forerunner 101", http://www.garmin.com/products/forerunner101, 2 pgs. (© 1996-2004).
Timex, "59551", http://www.timex.com/bin/detail.tmx?item=048148595514, 2 pgs. (© 1997-2004).
Garmin, "Forerunner 301", Runner's World, May 2005, p. 41, vol. 40 No. 5.
Nike Incorporated, Nike Map It, http:nike.com/nikeplus/?locale=en_us&l=mapit. (accessed Aug. 4, 2008).

* cited by examiner

*Primary Examiner*—Thomas G Black
*Assistant Examiner*—Wae Louie
(74) *Attorney, Agent, or Firm*—Brooks, Cameron & Huebsch, PLLC

(57) ABSTRACT

Systems, methods, and device are provided for generating a route based on a distance. One method embodiment includes program instructions which execute to receive a distance input and to generate a route based on the distance input.

26 Claims, 7 Drawing Sheets

ROUTE BASED ON DISTANCE

Route planning programs and devices are well known in the field of navigational instruments. Existing route generation programs are able to map out a route between two or more different locations. That is, existing routing algorithms can execute instructions in conjunction with cartographic data to generate a route once the program is given a particular destination address. These programs may also require the user to input their starting position. Other times, a device may use global positioning system (GPS) technology to register the device's starting location. Either way, existing routing algorithms will not generate a route unless a destination different from the device's starting location is provided. The resultant route can be displayed as a path on a printable map or a display on the device and can incorporate landmarks, street-names, sequential turning instructions, etc.

In some devices GPS technology can be continuously used to update the location of the device. One aspect common to these existing navigational programs and devices is that the underlying programs require a destination address different from the starting location.

DETAILED DESCRIPTION

Systems, devices, and methods are described which include program embodiments which can execute instructions to generate a route based on distance. The program embodiments execute instructions to receive a distance input and to generate a route based on a starting location and the distance. Embodiments include electronic devices standing alone, connected to a network, and/or having GPS capabilities.

Figure 1:
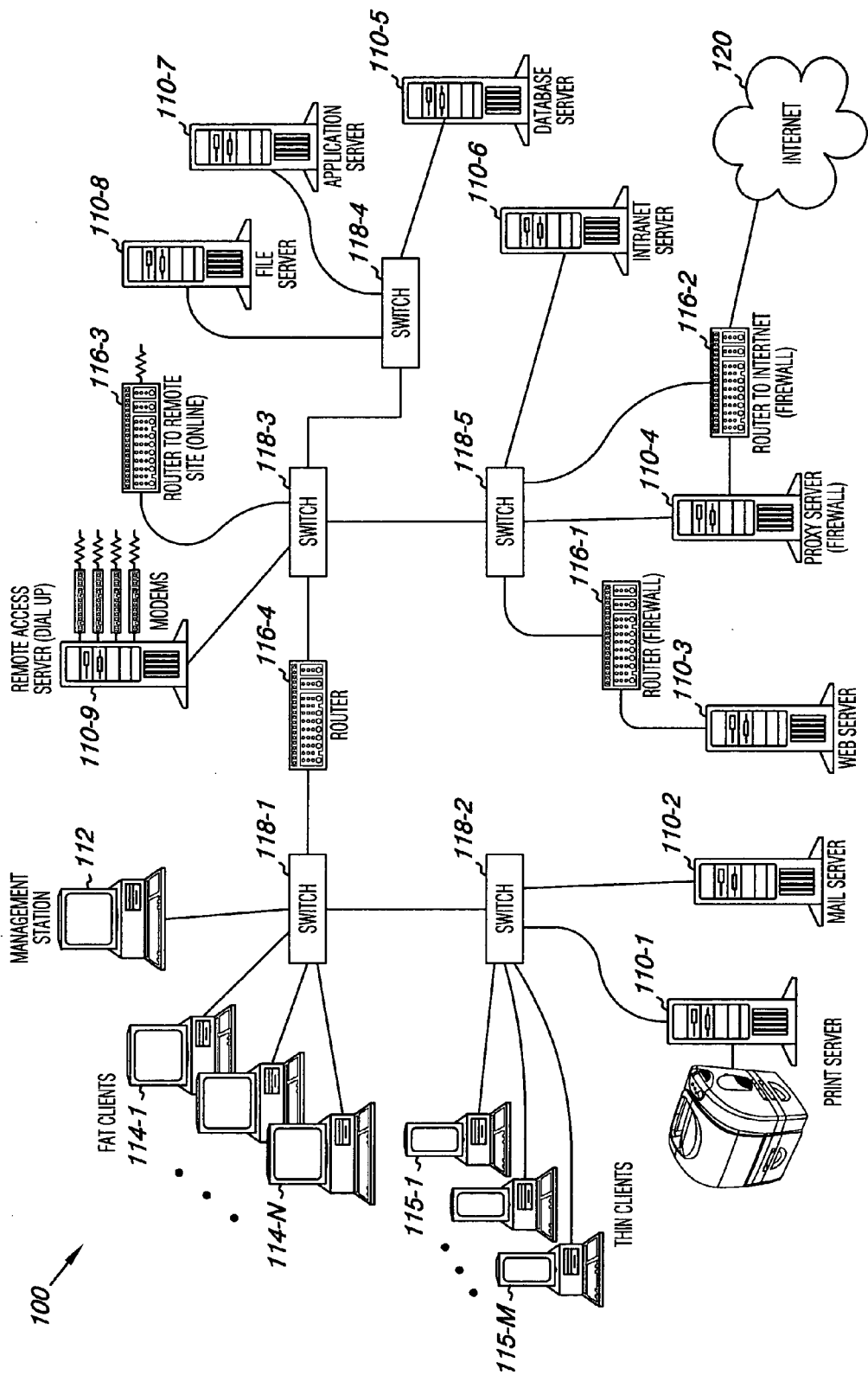
FIG. 1 illustrates an example of a computing device network which can include program embodiments described herein.

FIG. 1 illustrates a computing device network 100 in which the program instruction embodiments can be implemented. As shown in FIG. 1, a number devices, e.g., PCs, servers, peripherals, etc., can be networked together via a local area network (LAN) (e.g., an Ethernet network), a wide area network (WAN), a wireless local area network (WLAN) the public switched telephone network (PSTN), and/or the Internet using transmission control protocol/Internet protocol (TCP/IP) via routers, hubs, switches and the like (referred to herein as "network devices").

The embodiment of FIG. 1 illustrates clients and servers in a LAN. However, embodiments of the invention are not so limited. For example, the embodiment of FIG. 1 shows various servers for various types of service on a LAN. The exemplary network of FIG. 1 illustrates a print server 110-1 to handle print jobs for the network 100, a mail server 110-2, a web server 110-3, a proxy server (firewall), a database server 110-5, and intranet server 110-6, an application server 110-7, a file server 110-8, and a remote access server (dial up) 110-9. Again, the examples provided here do not provide and exhaustive list. The embodiment of FIG. 1 further illustrates a network management station 112, e.g., a PC or workstation, a number of "fat" clients 114-1, . . . , 114-N which can also include PCs and workstations and/or laptops, and a number of "thin" clients 115-1, . . . , 115-M which can include terminals and/or peripherals such as scanners, facsimile devices, hand-held multifunction devices, e.g., PDAs, PC tablets, cell-phones, and the like. The fat and/or thin client can include a device having the program embodiments (e.g., program instructions) discussed in more detail below. The designators "N" and "M" are used to indicate that a number of fat or thin clients can be attached to the network 100. The number that N represents can be the same or different from the number represented by M. The embodiment of FIG. 1 illustrates that all of these example network devices can be connected to one another and/or to other networks via routers, 116-1, 116-2, 116-3, and 116-4, and hubs and/or switches 118-1, 118-2, 118-3, 118-4, and 118-5, as the same are known and understood by one of ordinary skill in the art. Embodiments of the invention, however, are not limited to the number and/or type of network devices in FIG. 1's illustration. The network of FIG. 1 is further illustrated connected to the Internet 120 via router 116-2.

As one of ordinary skill in the art will appreciate, many of these devices include processor and memory hardware. By way of example and not by way of limitation, the network management station 112 will include a processor and memory as the same are well known to one of ordinary skill in the art. Similarly, fat and thin clients as well as the network devices of routers, 116-1, 116-2, 116-3, and 116-4, and hubs and/or switches 118-1, 118-2, 118-3, 118-4, and 118-5 can include processor and memory resources. Embodiments of the invention are not limited, for the various devices in the network, to the number, type or size of processor and memory resources. Program instructions can also be transmitted on a carrier wave using any number of RF technologies, e.g., Wi-Fi, Bluetooth, etc.

Program embodiments (e.g., computer executable instructions), as described in more detail below, can reside on the various network devices. For example, program instructions in the form of firmware, software, etc., can be resident on the network 100 in the memory of a network management station 112, of the number of "fat" clients 114-1, . . . , 114-N, of the number of "thin" clients 115-1, . . . , 115-M, of one or more routers, 116-1, 116-2, 116-3, and 116-4, hubs and/or switches 118-1, 118-2, 118-3, 118-4, and 118-5, and such program instructions can be executed by the processor(s) thereon. As the reader will appreciate, program embodiments can be resident in a number of locations on various network devices in the network 100 as employed in a distributed computing network.

Embodiments within the scope of the present invention include computer-readable media having computer-executable instructions or data fields storable thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired computer-executable instructions. Combinations of the above are also included within the scope of computer-readable media.

Computer-executable instructions include, for example, instructions to cause a general purpose computer, special purpose computer, or special purpose portable processing device to perform a certain function or group of functions, routines, etc. In some contexts, the computer-executable instructions are described as program modules being executed by processor resources within a computing device. Generally, program modules include routines, programs, objects, data structures, etc. that perform particular tasks. As used herein, a computing device can include PDAs, PC tablets, cellular phones, portable electronic devices, laptops, desktops, Blackberries, MP3 players, etc.

As provided herein, program instructions are not limited to a program written in any particular language. Nor is the program limited to any particular operating environment.

Figure 2A:
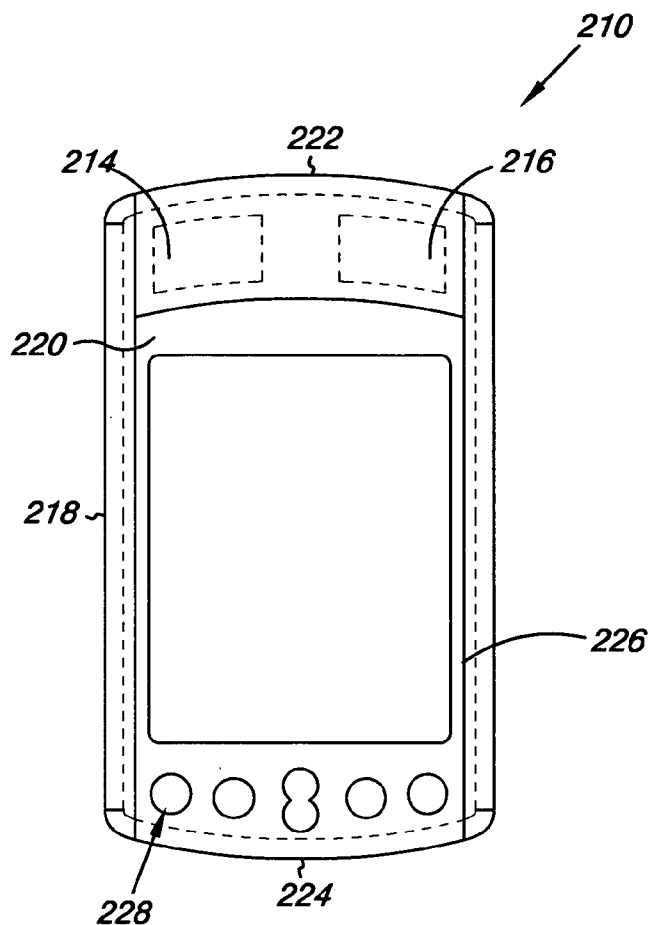
FIG. 2A illustrates an example of an electronic device which can include program embodiments described herein.

FIG. 2A illustrates a device which can include program instruction embodiments for producing a route based on a distance input. Device 210 shown in FIG. 2A can represent a personal digital assistant (PDA), a cellphone, MP3 player, iPod, Blackberry or other similar handheld multifunctional device. By way of example and not by way of limitation the device 210 could operate with an operating system (OS) such as the well-known Palm, Pocket PC, Linux, etc. The device of FIG. 2A is shown with a GPS patch antenna 214 and a cellular antenna 216 internally contained within a housing 218. However, not all embodiments of the current invention have these features as neither feature is essential for generating a route based on a distance input. In the embodiment of FIG. 2A the housing 218 is illustrated in a rectangular shape with a low profile that has a front face 220 extending from a top end 222 to a bottom end 224. Mounted on front face 220 is a display screen 226, which is touch sensitive and responsive to a stylus 230 (shown stored in the side view of FIG. 2B) or a finger touch. FIG. 2A illustrate the stylus 230 nested within housing 218 for storage and convenient access in a conventional manner. The embodiment shown in FIG. 2A illustrates a number of control buttons, or input keys 228 positioned toward the bottom end 224. Embodiments, however, are not so limited and one of ordinary skill in the art will appreciate that the input keys 228 can be positioned toward the top end 222 or at any other suitable location.

It should be understood that the structure of GPS integrated device 210 is shown as illustrative of one type of integrated PDA navigation device. Other physical structures, such as a cellular telephone, bike mounted device, wrist mounted device or any device that can be carried or worn are contemplated within the scope of this invention and can be used with the program embodiments described herein.

Figure 2B:
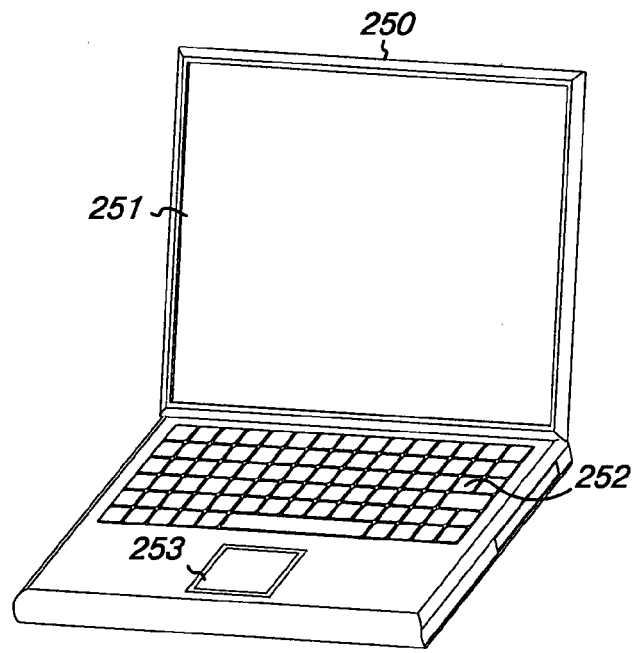
FIG. 2B illustrates another example of an electronic device which can include program embodiments described herein.

FIG. 2B illustrates another device which can include program instruction embodiments for producing a route based on a distance 250. Device 250 shown in FIG. 2B includes a laptop computer. By way of example and not way of limitation the laptop computer can include an operating system (OS) such as Windows, Mac, Linux, etc. As shown in FIG. 2B the laptop has a screen 251 for displaying information, a keyboard 252 and touch sensitive pad 253 for inputting data and manipulating the laptop computer. Other physical structures, such as desktop computers and servers, are contemplated within the scope of this invention.

Figure 3A:
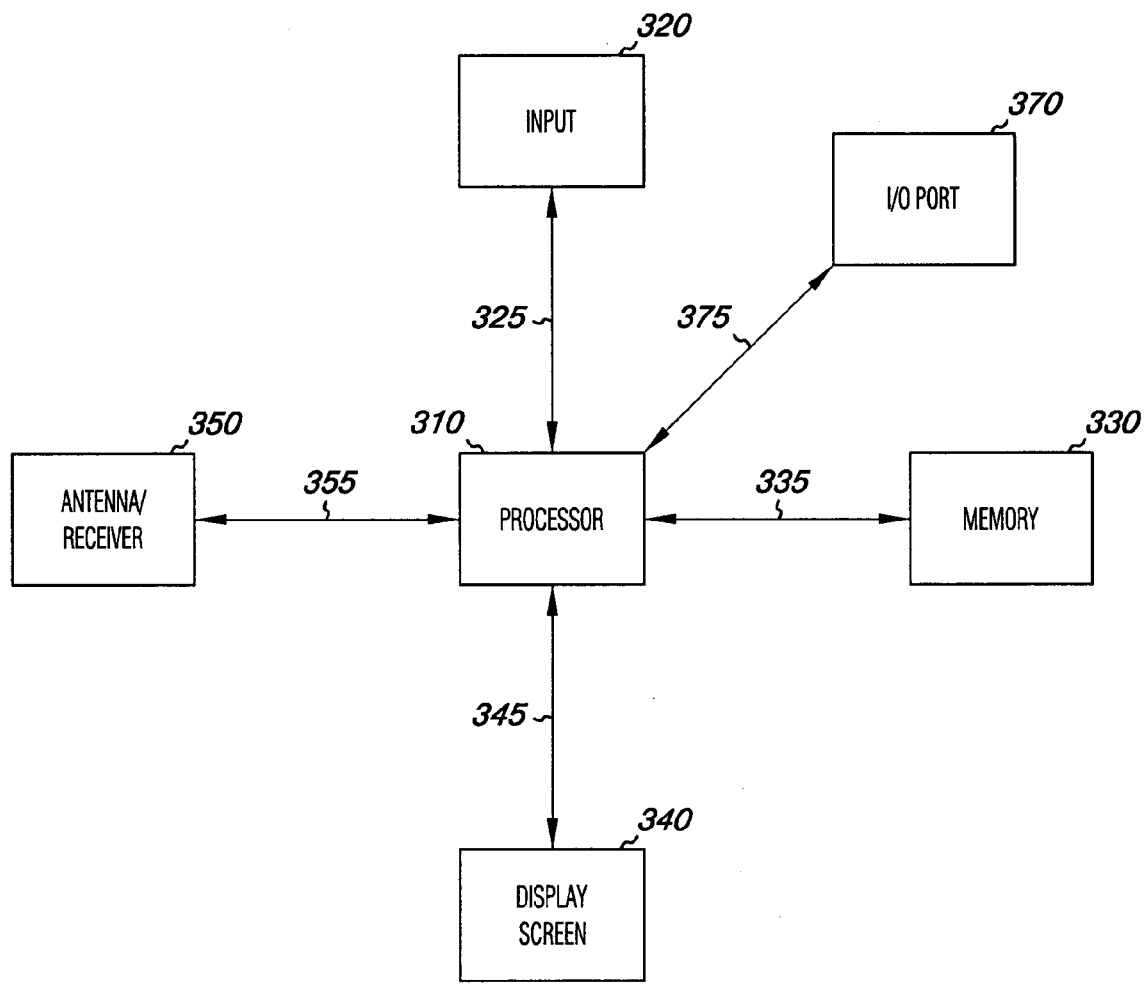
FIG. 3A is a block diagram example of the electronic components which can be included in the devices shown in FIGS. 2A-2B.

FIG. 3A is a block diagram of example electronic components which can be included in the devices shown in FIGS. 2A-2B. In the embodiment shown in FIG. 3A, the electronic components include a processor 310 which is connected to an input 320, such as a keypad, via line 325. It will be understood that input 320 may alternatively be a microphone for receiving voice commands. Processor 310 communicates with memory 330 via line 335. Memory 330 can include program instructions for generating a route based on distance and other selectable criteria. Processor 310 also communicates with display screen 340 via line 345. An antenna/receiver 350, such as a GPS antenna/receiver, is connected to processor 310 via line 355. It will be understood that the antenna and receiver, designated by reference numeral 350, are combined schematically for illustration, but that the antenna and receiver may be separately located components, and that the antenna may be a GPS patch antenna or a helical antenna. The electronic components further include I/O ports 370 connected to processor 310 via line 375. Processor 310, memory 330, and display 340 can include any type of processor, memory, and display capability in the art of computing. FIG. 3A could also represent some of the hardware components of laptop 2B, or any electronic computing device of the current invention. Embodiments, however, are not limited to the examples illustrated in FIG. 3A.

Figure 3B:
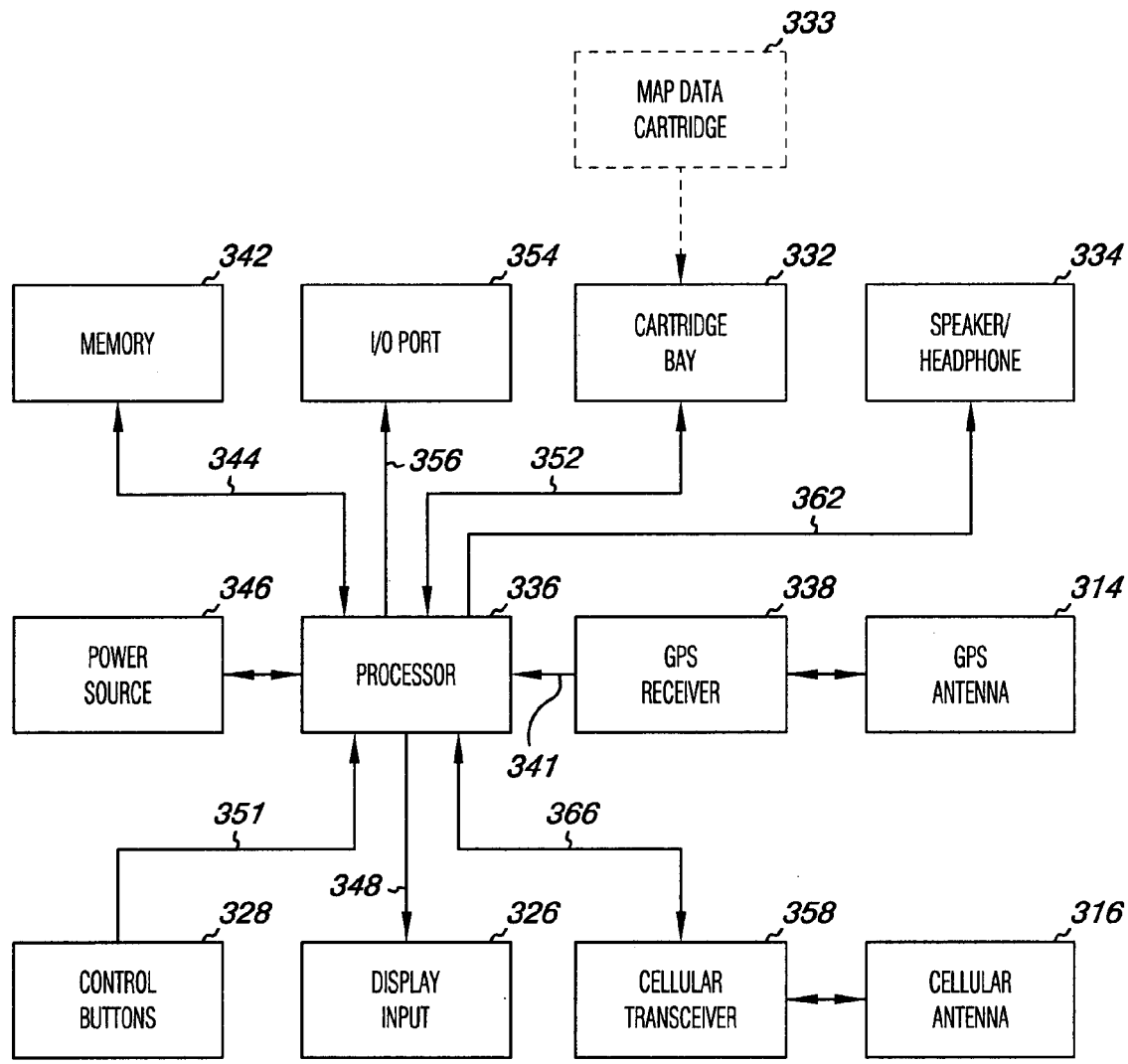
FIG. 3B is a block diagram providing another example of the electronic components which can be included in the devices shown in FIGS. 2A-2B.

FIG. 3B is a block diagram providing another example of the electronic components which can be included in the devices shown in FIGS. 2A-2B. The electronic components shown in FIG. 3B include a processor 336 which is connected to the GPS antenna 314 through GPS receiver 338 via line 341. The processor 336 interacts with an operating system (such as the examples given above) that runs selected software depending on the intended use of the embodiment. Processor 336 is coupled with memory 342 via line 344, and power source 346 for powering the electronic components. The processor 336 communicates with touch sensitive display screen 326 via data line 348. Processor 336, memory 342, and display 326 can include any type of processor, memory, and display capability in the art of computing.

The electronic components further include two other input sources that are connected to processor 336. Control buttons 328 are connected to processor 336 via line 351 and a map data cartridge 333 inserted into cartridge bay 432 is connected via line 352. Those in the art will appreciate that map data cartridge can include any computer readable medium, including ROM, RAM, flash memory, hard drives, floppy discs, memory cards, memory keys, optically readable memory, and/or some other types of volatile and/or nonvolatile memory. A conventional serial I/O port 354 is connected to the processor 336 via line 356. Cellular antenna 316 is connected to cellular transceiver 358, which is connected to the processor 336 via line 366. Processor 336 is connected to the speaker/headphone jack 334 via line 362. The electrical components illustrated in FIG. 3B may also include an infrared port (not shown) coupled to the processor 336 that may be used to beam information from one device to another.

The electronic components shown in FIGS. 3A and 3B can be powered by any power source as the same will be known and understood. Different configurations of the components shown in FIGS. 3A and 3B can be included with the embodiments described herein. For example, in some embodiments, the components shown in FIGS. 3A and 3B are in communication with one another via wireless connections and the like.

Exemplary Route Embodiments

FIGS. 4A-4G illustrate example routes generated by various program embodiments described herein. As the reader will appreciate, the program instructions may be resident and executed in various locations on a network such as illustrated in FIG. 1, on a device such as illustrated in FIGS. 2A and 2B, or a combination thereof. For example, in one embodiment cartographic data and program instructions to generate a route based on a distance input can be stored in the memory of a stand alone portable device such as those shown in FIGS. 2A and 2B. Alternatively, a portable device such as shown in FIGS. 2A and 2B can be connected in a wired and/or wireless fashion to a larger network and/or system, e.g., local area network (LAN), wide area network (WAN), etc. In such embodiments, the cartographic data and program instructions can be stored elsewhere in the larger network and/or system and accessible in the wired and/or wireless fashion therefrom. In such embodiments, the cartographic data and program instructions can be downloaded to the portable device for execution of the program instructions to generate a route based on a distance input along with the received cartographic data. Likewise, the distance input can be uploaded to the larger network and/or system where the program instructions, located elsewhere in the larger network and/or system, are executed based on the received distance information along with the cartographic data.

Combinations of these examples are similarly considered within the scope of the present invention. And, the embodiments are not limited to the examples listed above. That is program instructions executable according to the present embodiments need only be accessible by a user at some location, whether via cellphone, PDA, portable electronic device, laptop, desktop, etc., capable of receiving a distance input. As one of ordinary skill in the art will understand, the embodiments can be performed by software, application modules, and computer executable instructions operable on the systems and devices shown herein or otherwise. The invention, however, is not limited to any particular operating environment or to software written in a particular programming language. Software, application modules and/or computer executable instructions, suitable for carrying out embodiments of the present invention, can be resident in one or more devices or locations or in several and even many locations.

Unless explicitly stated, the method embodiments described herein are not constrained to a particular order or sequence. Additionally, some of the described method embodiments can occur or be performed at the same point in time.

Figure 4A:
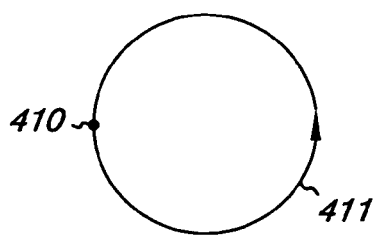
FIGS. 4A-4G a number of example routes which can be generated according to the program embodiments described herein.

FIG. 4A is representative of a route embodiment, based on a selectable distance input, generated by program instructions storable in a memory and executable by a processor. In the embodiment shown in FIG. 4A, the route 411 begins at a starting location 410 and ends at the starting location 410, the route covering a distance substantially corresponding to the selectable distance input. For example, as described above, program instructions executing on a device can receive a selectable distance input and generate the route based on the distance input along with available cartographic data and a chosen starting location. In some embodiments, the starting location is a location of the device, either input by a user or selected by the program instructions interacting with GPS information. In other embodiments, the starting location is a different location from the location of the device receiving the distance input. In these embodiments the starting location can be input by the user, e.g., by speaking or typing in a street address, using a stylus or touchscreen display, selecting a location from among cartographic information, etc.

For example, a user looking to go for a walk, hike, run, etc., could enter, i.e., input, their present location, e.g., street address, into a device, such as shown in FIGS. 2A, 2B, and/or connected to a network such as FIG. 1 or FIG. 5 (discussed in more detail below). The user can additionally enter a distance they would like to traverse, e.g., 2 miles. The program instructions can execute to receive the starting location information and the distance information. The program instructions are further executable to generate a route based on the starting location information, the distance information and accessible cartographic information. By way of example, in FIG. 2A a user may have entered their home street address and a distance of two miles. GPS may also have been used to identify the user's home street address as the location of a device where a user is accessing the program instructions and the user may have simply selected this information be used as the starting location. In one embodiment, the program instructions can be executed by the user without any additional input information being entered by the user. In such embodiments, such as can be represented by FIG. 2A, the program instructions will execute to generate a route which traverses the selected distance and returns upon completion of that distance to the starting location.

Thus, a user of a laptop and/or desktop computer having program embodiments storable and executable thereon could receive a route such as shown in FIG. 2A which if followed would take them from their present location, e.g., starting (or "first") location 410, traversing a path (route) equaling a distance of two (2) miles before returning them to their starting location 410. The route could include repeating the illustrative loop a certain number of times before the selected distance is achieved and completed at the starting location 410. The route can be displayed as a map and/or as a sequential series of distances and turning instructions on a display of the device. The user could then memorize, write down, print out or by some other means capture this information and traverse the route represented in FIG. 4A.

As noted above, the program embodiments do not have to be resident on a laptop and/or desktop, but additionally could be resident on a portable electronic device, e.g., cellphone, Blackberry, PDA, or other electronic device having logic and memory resources, or accessible from any of the above over a network such as shown in FIG. 1 and described below in FIG. 5. The generated route can be displayed using such devices and carried with the user while they are traversing the route. In the embodiments where the device includes GPS capabilities, the device could additionally display the device's location as the device moves along the route. In some GPS enabled embodiments, as the same are known in the art, the device could even issue audible and/or text instructions if the device deviates from the route. Likewise, according to some embodiments (discussed in more detail below), program instructions can execute to issue audible and/or text instructions of interests to a user of the device as the device moves along the route. For example, program instructions can execute to provide recorded, audible and/or text instructions as motivation and/or suggestions. In some embodiments, the program instructions execute to allow a user to select and/or record key phrases, music, video, etc. which a user may enable or disable.

As noted, embodiments are not limited to the above described additional features. The reader will appreciate that a user of the program embodiments can benefit from simply seeing the route generated and displayed in any of the above scenarios and then proceeding to traverse the route from the user's memory and personal recollection without more. Additionally, the user of the program embodiments can print the route, using any attachable/available printing mechanism in order to carry the route directions and/or route image in paper form or can transfer the route directions and/or route image to another electronic device (e.g., IR transfer to a PDA) to carry with them as they traverse the route.

As the reader will appreciate, with appropriate cartographic data available, a user can access the program instructions, enter a distance, and a starting location at any global geographic location to generate the above described route. Thus, for example, if a runner, walker, hiker, etc., is traveling to another city on business and/or leisure, e.g., user lives in Minneapolis, Minn. and is traveling to Seattle, Wash., they could enter their lodging address, e.g., hotel, as the starting location along with a desired distance, and the program instructions will execute to generate a route embodiment as illustrated in FIG. 4A or according to any of the other example route embodiments to follow.

Figure 4B:
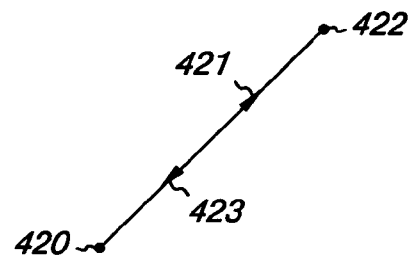

FIG. 4B is representative of another route embodiment generated by program instructions storable in a memory and executable by a processor. In the embodiment of FIG. 4B, the route begins at a starting location 420 and includes; a first leg as indicated by the direction of arrowhead 421, a second location 422, a second leg that retraces the first leg as indicated by the direction of arrowhead 423. According to embodiments, the route will cover a total distance substantially corresponding to a distance input to the program instructions. In some embodiments, the second location 422 can include a location furthest from the starting location 420. Embodiments, however, are not so limited. In this example route embodiment, the user, e.g., walker, hiker, runner, biker, driver, boater, canoe/kayaker, etc., may only be looking to traverse a particular distance and is not concerned about any other selectable parameters/criteria (as discussed in more detail below). As such, the route embodiment illustrated in FIG. 4B shows an "out-and-back" scenario, i.e. going out to a location half the distance input and then returning to the starting location.

Figure 4C:
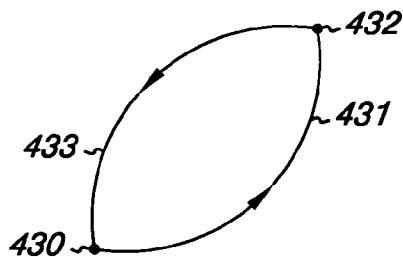

FIG. 4C is representative of another route embodiment generated by program instructions storable in a memory and executable by a processor. In the embodiment of FIG. 4C, the route begins at a starting (or "first") location 430 as the same has been described herein. The route embodiment of FIG. 4C includes a first leg 431, a second location 432 at a different location from the first location 430, and a second leg 433 that is different from the first leg 431. In the embodiment of FIG. 4C the route completes, i.e., ends, once again at the starting location 430, and covers a total distance substantially corresponding to the distance input. In this example the first leg 431 could cover a distance shorter than, equal to, or greater than the second leg 433. According to embodiments, the second location 432 can include a user selected location, e.g., a "waypoint" as the same are known and referred to in the cartographic arts. The second location can also be determined and chosen by the program instructions in generating the route based on another selectable parameter/criteria input to the program instructions such as a rest stop or waypoint selected by the user in referencing cartographic information.

That is, various program embodiments include instructions which can execute to receive a number (or "set") of other selectable criteria to be used in generating the route. By way of example and not by way of limitation, the selectable criteria can include input which reflects a user's desire to traverse hiking trails, city streets, pedestrian paths, one or more preferred path compositions (e.g., grass, asphalt, dirt, etc), particular terrain (e.g., hilly, mountain, flat, etc.), and/or elevations (e.g., climbs, descents, and/or combinations thereof). The selectable criteria can also include a user's desire to be proximate to certain safety, geographical, and/or human made features (e.g., forest, lakes, rivers, streams, well lighted roadways, cityscapes, police call box, etc.). The selectable criteria can also include a user's desire to have access to one or more particular facilities along the route. By way of example and not by way of limitation, the one or more particular facilities can include a refreshment facility, a lodging facility, a rest room facility, a shopping facility, etc.

Further, various program embodiments include instructions which can execute to receive input which associates a selectable rating factor with each of the selectable criteria, e.g., high, medium, or low importance. In these embodiments the program instructions can execute to generate the route based on an analysis of the selected criteria and any rating factors associated therewith. For example, it is foreseen that while a user may enter a wide range of selectable criteria and associated rating factors as input to the program instructions, it may be implausible for the program instructions to accommodate all of these user preference in any one particular route while adhering to the distance input.

Thus, as the reader will appreciate, the program instructions execute to best accommodate the selected criteria based on the rating factors associated therewith and based on available cartographic data relating to the area in which the route is being generated. For example, the program instructions can execute to generate a route which has a starting location a quarter (¼) away from a user's present location. As another example, a distance input of five (5) miles may be chosen by a user and the program instructions execute to generate a route which is plus or minus a quarter mile (+/−), e.g., 4.89 miles, based on accommodating selected parameters/criteria, including rating factors, and the available cartographic data. Additionally, various program embodiments include instructions which can execute to allow a user to accept or reject a generated route. For example, the program instructions may execute to generate a route which includes a portion through an area, or by a location, which a user does not wish to traverse. In this scenario, a user can input instructions for the program embodiments to generate another route, avoiding the particular area or location, or even inputting other more specific input information, e.g., the user recognizes that a climb is too steep and subsequently provides input for more level terrain. Similarly, the program instructions can execute to store generated routes for reuse and selection, whether random selection (e.g., cycling through, varying, etc.) or otherwise, at a later time and/or date. Further, such stored routes may be stored according to distance or other classifications and categories, e.g., hill runs, long runs, short runs, etc.

With the above disclosure in mind, the embodiment of FIG. 4C may represent an example where a user input as a selectable criteria the desire to pass by a restroom facility approximately half way through traversing the route, and input the desire to follow a return path to the starting location which is different from simply retracing the route "out-and-back" as shown in FIG. 4B.

Figure 4D:
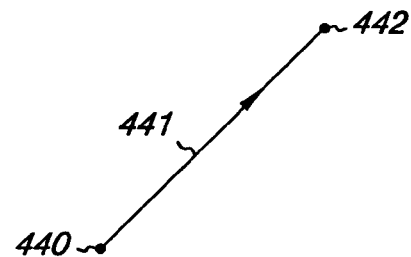

FIG. 4D is representative of another route embodiment generated by program instructions storable in a memory and executable by a processor. In the embodiment of FIG. 4D the route 441 begins at a starting (or "first") location 440 and ends at a second location 442 that is different from the starting location 440. According to the embodiments, the route covers a total distance substantially corresponding to the distance input. However, in this embodiment the user has not elected to return to the starting location 440. As noted earlier, various program embodiments may default to generating a route which completes, after traversing the distance input, at the starting location. As illustrated by FIG. 4D, embodiments are not limited to generating a route which completes at the starting location after accommodating the distance input.

As example of such a scenario would be when a user wishes to traverse a particular distance, but is not dependent on the returning to their location upon completion of traversing the distance. For example, a runner may wish to run five (5) miles toward downtown (which can be a selectable criteria input), but then wishes to stop running and walk around sightseeing, get on an alternative mode of transportation, etc. As another example, a user in a canoe may wish to travel a distance downstream equal to the distance input, but then plans to call a friend to pick them up.

As such various program embodiments can execute to ask the user whether the route is to complete at the starting location. That is, in certain embodiments, returning to the starting location may be a default mode. Still other program embodiments can be included, which can be selected by the user, and which do not default to returning to the starting location. Thus various program embodiments are provided which can override the default mode of returning to the starting location while still accommodating the distance input in generating a route.

Figure 4E:
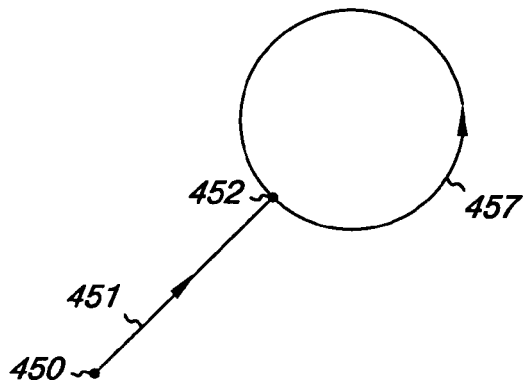

FIG. 4E is representative of another route embodiment generated by program instructions storable in a memory and executable by a processor. The route embodiment of FIG. 4E is similar to some of the features discussed in FIG. 4D in that the route does not complete at the starting location. In the embodiment of FIG. 4E, the route begins at a starting location 450 and includes a first leg 451, a second location 452 different from the first location 450, and a second leg 457 that is different from the first leg 451 and ends at the second location 452. According to embodiments, the route covers a total distance substantially corresponding to the distance input. As described above, the program instructions execute to generate the route embodiment based on a distance input and can execute to attempt to accommodate a number of other user selectable parameters/criteria. As before, the first leg 451 could cover a distance shorter than, equal to, or greater than the second leg 457. Embodiments are not so limited. In this embodiment, the second location 452 can be referred to as a divergence location 452 and the second leg 457 is illustrated as a circular path leading from the divergence location 452 and completing the route back at the divergence location 452. As the reader will appreciate, other user selectable parameters/criteria with or without associated rating factors can include route configurations such as straight-aways, loops, out-and-back, retracing, and other leg or sectional configurations, etc. Such route configurations may also be generated by the program embodiments executing instructions even without a user selectably inputting other parameters/criteria.

One example scenario for the route embodiment of FIG. 4E includes the case where the user has provided a distance input, selected a mode which does not require that the route return to the starting location, and has provided one or more selectable criteria such as a requests for; pedestrian/jogging/running/bike paths, and geographic features such as including creeks, streams, and/or lakes (e.g., or generally water bodies). As described above, each such parameter/criteria could be associated with a rating factor based on a user input, e.g., high, medium, or low, etc., when they enter the particular parameter/criteria. The embodiment shown in FIG. 4E can reflect a route which leads from the starting location, e.g., a user's home street address, to a nearby lake and circles a jogging path around the lake and completing when a distance substantially equal to the distance input has been traversed.

The reader will appreciate, that it is possible for the route to have completed before returning to the divergence location 452 in order to accommodate the distance requested by the user. The reader will further appreciate that it is not altogether necessary for the user to have switched to a mode which purposefully does not return to the starting location 450 to achieve the route embodiment of FIG. 4E. Instead, a user may have simply associated a lower rating factor to this selectable parameter/criteria, i.e., returning to the starting location, than the user associated with another selectable parameter/criteria, i.e., completing a loop around the lake. The reader will also appreciate that the program embodiments may have executed instructions to initially generate a route which went partially around the lake, stopped, and then retraced the previous path in order to accommodate completing the route back at the starting location. Here, the user upon viewing the proposed route may have caused the program instructions to execute to generate a new route this time including additional user input as selectable parameter/criteria in order to have the route completely circle the lake before completing, or as much as possible before the distance input was met.

Figure 4F:
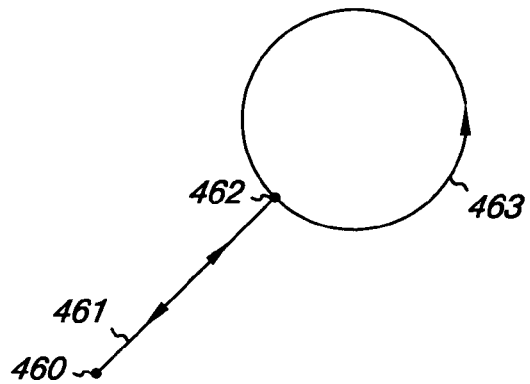

FIG. 4F is representative of another route embodiment generated by program instructions storable in a memory and executable by a processor. In the embodiment of FIG. 4F, the route begins at a starting location 460, includes a first leg 461, a second location 462 (e.g., divergence location), a second leg 463 that converges back to the second location 462, and a third leg that retraces the first leg 461 completing the route back at the starting location 460. Again, the program embodiments will execute instructions to first generate a route that covers a total distance substantially corresponding to an distance input. However, the route embodiment of FIG. 4F may illustrate an example of where the user upon viewing an first proposed route (e.g., which stopped partially around the lake or before returning to the starting location 460) may have caused the program instructions to execute to generate a new route this time including additional user input as a selectable parameter/criteria to change, modify, and/or override the distance input to generate a route which completely circles the lake and which continues until returning to the starting location 460. As the reader will appreciate, program embodiments can execute to provide a user with the option of modifying any of the number of selectable criteria in order to generate a new route. Thus, a user may have initially assigned a "high" rating factor to a selectable criteria of "not retracing any part of the route" and then lessened the rating factor associated therewith, or removed this criteria altogether in executing the program instructions to generate a new route.

The reader will further appreciate that the embodiments include route configurations selected by the user and route configurations not selected by the user but generated based on selected parameters/criteria and/or non-selectable parameters/criteria. For example, the route embodiment of FIG. 4F, the user could have provided a distance input, a request that the route include a park, and that the route concludes at the starting location 460. The route was then generated with leg configurations 461 and 463 with leg 463 including a loop 463 and the third leg, e.g. leg from the divergence location 462 back to the starting location 460, retracing the first leg 461. In this scenario the user did not select these configurations, e.g., the loop and retracing geometries to the route, but rather the loop and retracing legs were generated based on other parameters/criteria, including but not limited to selected parameters/criteria such as distance and the requirement for the route to include a park.

Other parameters/criteria the user may not have selected but were still factored into route generation, such as available roads and pathways, lakes, rivers, and impassible obstacles, etc. For example, as noted above the loop 463 may circumscribe a lake and the third leg may retrace the first leg because that particular portion of the route represents the only available path between the starting location 460 and the divergence location 462, e.g., the only available path while attempting meet selectable criteria such as avoiding highly trafficked vehicle roadways. Likewise the user may have entered the divergence location as a waypoint to expressly include in the route as one of the selectable parameters/criteria.

Figure 4G:
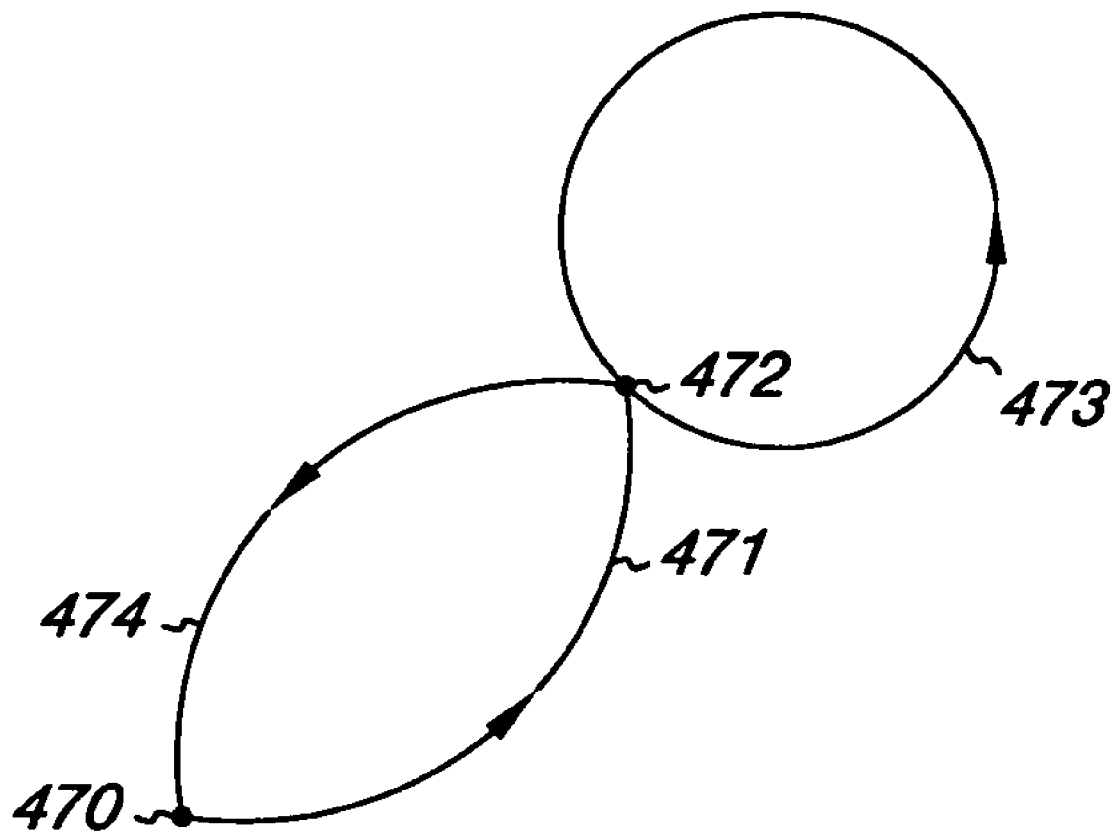

FIG. 4G is representative of another route embodiment generated by program instructions storable in a memory and executable by a processor. In the embodiment of FIG. 4G, the route begins at a first location 470, includes a first leg 471, a second location 472 different from the first location 470, a second leg 473 that is different from the first leg 471 and that converges back to the second location 472, and a third leg 474 that is different from the first leg 471 that ends at the first location 470. According to embodiments, the route covers a total distance substantially corresponding to an distance input. In this example, the first leg 471, the second leg 473 or the third leg 474 could be shorter than, equal to or longer than any of the other legs. Embodiments are not so limited. The embodiment illustrated in FIG. 4G illustrates the manner in which a user can select a waypoint, e.g., second location 472, as a particular location they desire the generated route to include. As noted above, the remaining legs, e.g., 471, 473, and 474 can be generated based on user selected parameters/criteria and/or non-selectable parameters/criteria.

For example, a user could have selected waypoint 472 as a location at a lake, park, etc., that they would like to be proximate to in the route. The program instructions based on this user selectable parameter can continue to generate a route which circles the lake and returns to the waypoint 472. Further, the user can enter as a selectable parameter that they do not wish to retrace any portion of the route. Accordingly, the route is generated to return to the starting location using a final or third leg different from the first leg. Additionally, program instructions can execute to receive a number of different distance inputs to use with each different leg, e.g., 471, 473, and 474. Embodiments are not limited to the examples provided herein. The user will appreciate from reading this description the many variants that are included in the scope of the present invention based on the few examples illustrated above.

As described above, the program embodiments can execute instructions which employ various user selectable parameters/criteria into the route generation process in addition to the distance input. Such user selectable parameters/criteria can include those listed above, e.g., can include but are not limited to elevation, typical roadway speeds, etc. For example, the user may want to avoid roads which are typically traveled by motor vehicle faster or slower than the user prefers. That is, the program instructions can take into account the relative difference between interstates, highways, city streets, county roads, scenic roads and neighborhood streets). Additionally, the user selectable parameters/criteria can include crime data, street lighting, type of pathways (which could include but are not limited to trails, bike paths, sidewalks, streets and highway), population density, types of areas to avoid (examples of which could include but are not limited to dumps and industrial sites), road construction, safety call boxes, available public telephones, weather predictions, terrain, and routes previously generated and/or traveled. That is, a user may provide input to the program embodiments indicating that a user does not wish to repeat a previously generated route.

As described above, the program embodiments also include the ability for a user to provide input to override one or more initially proposed route and even modify, revise, change, etc. the total distance of the route initially provided as the distance input. By way of example and not by way of limitation, a variance in the total distance may be entered by the user as one of the user selectable parameters/criteria. For example, the program embodiments can execute to receive instructions to generate a route based on a distance input of five miles with the user selectable parameters/criteria input indicating that plus two miles or minus one mile is acceptable (i.e., a tolerance range, including such specifics as "not under a distance of" and "not over a distance of"). In this example the route generating program instructions can execute to first generate a route having a total route distance of five miles. However, if certain other user selectable parameters/criteria include rating factors which override the distance input such that a route of five miles is not practical the program instructions can execute to provide a route which takes into account the other user selectable parameters/criteria and their associated rating factors as well as the user selectable variance in the distance input to generate a route with a total distance within the distance variance. Embodiments also include the ability to suggest routes with total distances approximating but not equal to the distance input if, based on the other parameters/criteria and constraining variables (such as but not limited to fixed road length), a route of the exact distance input is not practical.

As the reader will appreciate, a portable device such as shown in FIG. 2A and including the components of FIG. 3B can include various program embodiments which can execute to interact with GPS input signals to provide position information as the device traverses the route embodiments described above. Additionally, such embodiments can execute instructions to maintain a track log, e.g., where the device actually traveled, and performance information, e.g., how fast the device traversed a particular portion of a route including information on the terrain, elevation, and path composition, etc., of the route among those various portions of the route. Program embodiments can execute to record this information and can execute in interaction with other software to advise a user on training information. For example, a user may subscribe to a service which makes certain program embodiments available where a user can participate in a training program, enter their running habits and interests, e.g., distances, participation in certain races, running gear preference.

Program embodiments can record this information and can execute to provide a user with notifications based on a recorded user profile. Thus, for example, when a user logs in to the subscription service, the program embodiments can execute to provide notifications to the user including relevant race registrations, running club memberships, race gear advertisements, and training instructions pertaining to upcoming race entries and/or other general training preferences. According to some embodiments, these program instructions will execute to automatically select (or automatically generate) a recommended distance to use as the distance input based on a particular training routine relevant to an upcoming race, e.g., whether the training routine is a user requested training routine or subscription service recommended training routine, etc.

For example, program embodiments include instructions which can execute such that a user does not have to enter a distance, but rather the route is generated by receiving a distance, a starting location and possibly other parameters/criteria as determined by the particular training routine. Program embodiments can further execute instructions to compile a user's personal performance history over the course of traversing one or more routes so generated by the program embodiments and can execute to analyze a user's performance vis a vis a given training program, fitness program, etc. As the reader will appreciate a user can input instructions to create their own personalized training routine and the program instructions can execute to track, record performance, and analyze the same. Third party software may also be accessed and interact with the program embodiments described herein to list recommended distance inputs and/or automatically enter these distances into one of the route generation executions. Further, particular fitness program data, track logs, training routines, etc., can be storable in memory and executable by a processor in conjunction with the program embodiments to vary each route generated in order to adjust the distance as well as other factors, including a rating factor, which could include but are not be limited to, elevation, hills encountered on the route and parameters/criteria of other routes traveled or planned. Likewise, the program embodiments can execute to maintain a substantially static distance to a route but still vary each route generated in order to provide variety. According to embodiments the rating factor can be a compilation of possible variables factored together to produce a single or multiple parameters/criteria. Again, these various parameters/criteria can include but are not limited to elevation, hills, heart rate target, obstacles encountered, type of terrain, distance, duration, speed, time, and mode of traveling (e.g., including but not limited to walking, jogging, sprinting, biking, boating, in-line skating, skiing, etc.)

As described above, program embodiments include but are not limited to program instructions which can execute to generate a route based on distance on a portable electronic device, a PDA, a computer, a cell phone or any device containing a processor and program instructions storable on memory. Different embodiments also include configurations where the route generation is performed on a server or on one other device in communication with another device. By way of example and not by limitation, a distance and starting location and possible other parameters/criteria can be entered on a PDA and transmitted to a server where program instructions storable in a memory and executable by a processor within the server generates the route and then transmits a map and/or route instructions back to the PDA corresponding to the route generated. In these embodiments different means of communication can facilitate the communication between devices. Example means of communication between devices include those understood by those familiar with the art of electronic data transmission and include but are not limited to radio frequency (RF) in all bands including megahertz and gigahertz, digital communication, analog communication (such as over a publicly switched telephone network), cellular communication, satellite communication, etc. Embodiments, however, are not limited to these examples.

Program embodiments can execute instructions to generate a route to another location, including based on a new distance input, while the user is traversing a previously generated route. For example, a user traversing route 4F may decide to execute program instructions to generate a new route ending at the starting location 460 (which may represent the user's home), based on a new distance input, e.g., a runner may be exhausted, sick, and/or injured and need a shorter, faster, more direct route to the starting location than is available on the route originally generated. Alternatively, in this example, a runner may be full of energy and wish to run an additional five miles, along a most scenic route, and still have a newly generated route return them to the starting location of the original route or an alternative destination. Thus, in one scenario the user may become tired or sick and not want to complete the full distance originally input. In another scenario the user may want to add additional distance to the original distance input traversed before arriving at the starting location or alternative end location.

According to various program embodiments, program instructions can execute to receive and include as selectable parameters/criteria information on several forms of transportation. For example, a user may input parameters/criteria that may include but are not limited to coordinating with bus routes, subways, and roads suitable for walking, etc. in executing program instructions described herein in addition to the distance input. In such scenarios, the program instructions can execute instructions to generate a route, e.g., the route embodiment illustrated in FIG. 4G, where the first leg 471 is traversed by bus, the second leg 473 is traversed by foot (e.g., running, jogging, walking, hiking, kayaking, biking, in-line skating, etc.), and the third leg is traversed by subway. As the reader will appreciate, embodiments can include the use of the above described information corresponding but not limited to, bus routes and schedules, light rail routes and schedules, subway routes and schedule, train routes and schedules, plane route and schedules, taxi routes and stations, shuttle routes and schedules, bike paths, equipment rental stations (e.g. bike rental facilities), etc., all of which can be storable in a memory.

Additionally, program embodiments include instructions which can be executed to generate a route where the distance input is limited to only a portion of a total route, e.g., a portion of a route 473 between a starting location and a destination location. For example, a user may input a distance and one or more selectable parameters/criteria indicating that a distance to be traversed by foot include only a loop around a lake. In this example, a user may have chosen an alternative mean of transportation, e.g. car, bus, etc., to reach the second location 472, e.g., the lake. Thus, the program instructions described herein can execute to generate a route, e.g., as illustrated in FIG. 4G, where the first leg 471 includes travel by car to a lake, the second leg 473 is traversed by a user on foot (e.g., hiking, jogging, skating, etc.) and circles a lake according to a distance input, and a third leg includes travel by car once again, according to a different path as illustrated by the third leg 474, e.g., that passes in proximity to a user selectable location (waypoint) relevant to an errand such as the grocery store.

Figure 5:
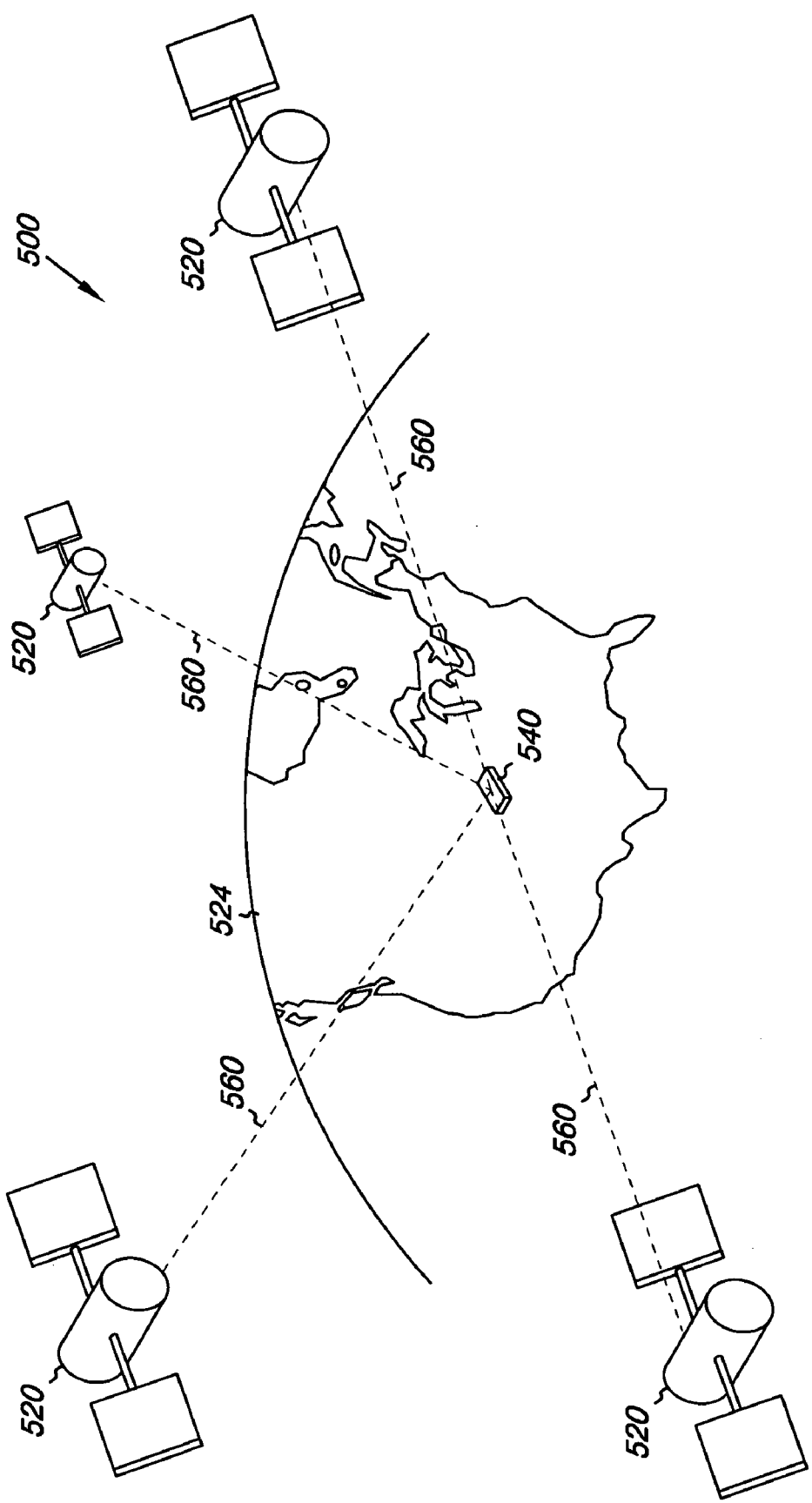
FIG. 5 illustrates a satellite network which can include GPS capabilities and be used in conjunction with the embodiments described herein.

FIG. 5 illustrates a satellite network 500 which can include GPS capabilities and be used in conjunction with the embodiments described herein. As shown in FIG. 5, a number of satellites 520 are in orbit about the earth 524. The satellite network shown in FIG. 5 can include, but is not limited to, GPS, Sirius, XM, Dish, DirecTV, or any other satellite provider network, etc., as the same are know and understood by one of ordinary skill in the art. The orbit of each satellite 520 is not necessarily synchronous with the orbits of other satellites 520 and, in fact, is likely asynchronous. A satellite receiver device 540, which can include a GPS receiver is illustrated receiving satellite signals 560, which can include GPS signals, from the various satellites 520.

These satellite signals 560, continuously transmitted from each satellite 520, utilize a highly accurate frequency standard accomplished with an extremely accurate atomic clock. Each satellite 520, as part of its data signal transmission 560, transmits a data stream indicative of that particular satellite 520, etc. It will be appreciated by those skilled in the relevant art that in GPS embodiments the satellite receiver device 540 must acquire spread spectrum GPS satellite signals 560 from at least three satellites 520 for a GPS receiver device 540 to generate its two-dimensional position by triangulation. Acquisition of an additional signal 560, resulting in signals 560 from a total of four satellites 520, can permit a GPS receiver device 540 to generate its three-dimensional position. As such position information can be provided to the program embodiments described herein.

Additionally, program embodiments according to the present disclosure include the ability to execute instructions to receive content and/or data from one or more satellite networks 520. Indeed, program embodiments can execute instructions to receive different signals from different satellite network providers. For example, one satellite network can provide one or more different kinds of content and/or data, including but not limited to GPS data, software updates, subscriber service information, and cartographic data. The subscriber service information can include information such as running gear advertisements as streaming media, race clubs, training and/or race information, etc. According to some embodiments, program instructions execute to provide the above described information based on, or relevant to, a particular starting location.

As the reader will appreciate, content and/or data available from a satellite network 520, a cellular network and/or other network (not shown) can include positioning data, analog data, digital data, audio, video, cartographic data, directory information, news, entertainment, weather information, communications data, etc. Program embodiments according to the present invention can execute instructions to receive and use as parameters/criteria all such satellite provided information.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes any other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A portable electronic device for generating a running route, comprising:
    a global positioning system (GPS) receiver;
    a processor;
    a memory in communication with the processor; and
    program instructions storable in memory and executable by the processor to receive a distance input and to generate a running, route that begins at a starting location and ends at the starting location, and to receive location information from the GPS receiver to track the portable electronic device along the running route,
    wherein the running route has a length substantially equal to the distance input, and wherein the running route includes an off-road portion.

2. The device of claim 1, wherein the starting location is an initial location of the portable electronic device as determined by the GPS receiver when the route is generated.

3. The device of claim 1, wherein the distance input is specified within a tolerance range.

4. The device of claim 1, wherein the off-road portion is a pedestrian path.

5. The device of claim 4, wherein the off-road potion is a bike path.

6. The device of claim 5, wherein the running route is generated based on analysis of a selected criteria and an associated rating factor associated.

7. The device of claim 6, wherein the route is generated to avoid roads having a particular motor vehicle speed range.

8. The device of claim 4, wherein the running route is generated based on selected terrain elevation criteria.

9. A portable electronic system for generating a running route, comprising:
    a first computing device connectable to a network, wherein the first computing device includes:
       a global positioning system (GPS) receiver;
       a processor;
       a memory in communication with the processor;
       a display in communication with the processor and memory; and
       program instructions storable in memory and executable by the processor to receive a distance input and to generate a running route that begins and ends at a starting location, and to receive location information from the GPS receiver to track the device along the running route,
    wherein the running route has a length substantially equal to the distance input and is generated based on a selectable set of criteria and a selectable rating factor associated with a particular criteria, and
    wherein the running route and device location are graphically represented on the display.

10. The system of claim 9, wherein the portable electronic system includes a cellular transceiver, wherein the first communication device is in communication with the network via the cellular transceiver.

11. The system of claim 9, wherein the program instructions execute to generate the running route including a leg traversed by a user on foot along an off-road path, and another leg by which the user traverses by motorized transport.

12. The system of claim 11, wherein the first computing device is adapted to be connected to a remote server over the network and receive training instructions.

13. The system of claim 9, wherein the program instructions execute to record performance in traversing the running route routes, the performance being analyzed in relation to a training program.

14. The system of claim 9, wherein the program instructions execute to generate the running route coordinated with public transportation routes and schedule.

15. The system of claim 9, wherein the starting location is received from a selectable training routine.

16. The system of claim 15, wherein the distance is received from the selectable training routine.

17. The system of claim 9, wherein the selectable set of criteria include use of pedestrian paths in the running route.

18. The system of claim 17, wherein the program instructions execute to generate a running route that passes a rest room facility substantially half way along the running route.

19. The system of claim 9, wherein the selectable criteria can each include the selectable rating factor.

20. The system of claim 19, wherein the selectable criteria includes particular demographic data and the program instructions execute to generate the running route to avoid areas characterized by the particular demographic data.

21. The system of claim 9, wherein the selectable criteria includes a user preference regarding previously generated routes, and program instructions execute to generate a running route that does not repeat a previously generated route.

22. The system of claim 9, wherein the program instructions execute to generate a route confined to bodies of water.

23. The system of claim 9, wherein the device is a portable handheld device attachable to another physical object.

24. The system of claim 9, wherein the device is adapted to automatically record a training log.

25. The system of claim 24, wherein the training log includes elevation information associated with the running route.

26. A computer readable medium having instructions executable for causing a device to perform a method for generating a running route, comprising:
- receiving a distance input; and
- generating a running route that begins and end at a starting location,
- receiving location information from a global positioning system (GPS) receiver to determine the starting location and track the device along the running route,
- wherein the running route has a length substantially equal to the distance input, is generated based on a selectable set of criteria and a selectable rating factor associated with each particular criteria, and wherein the running route includes an off-road portion.

* * * * *